J. S. FAX.
ILLUSION TOY.
APPLICATION FILED JULY 18, 1908.
904,121.
Patented Nov. 17, 1908.
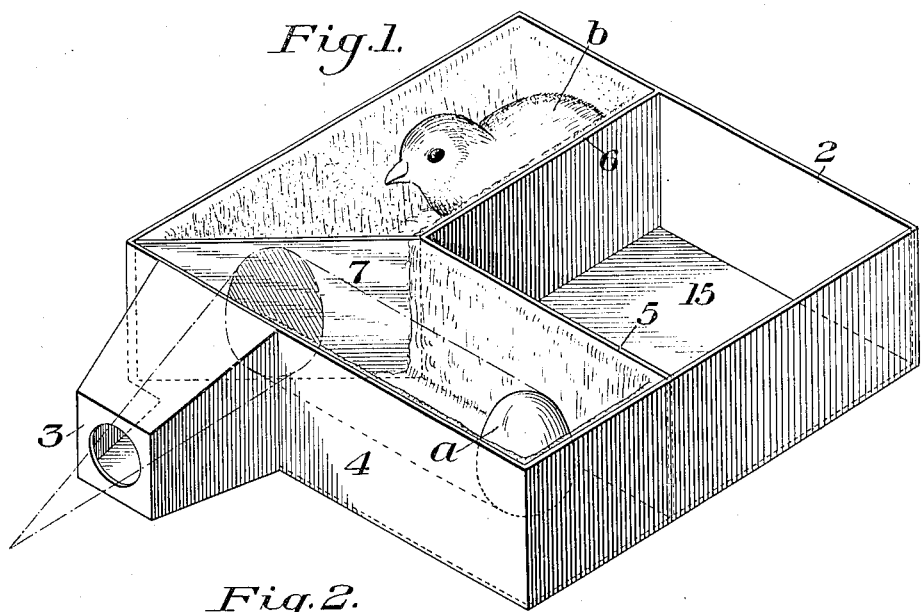
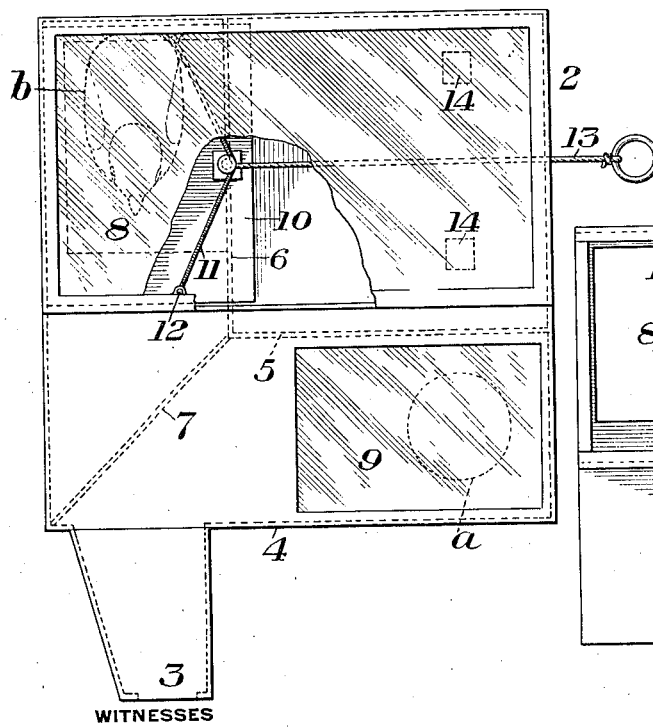
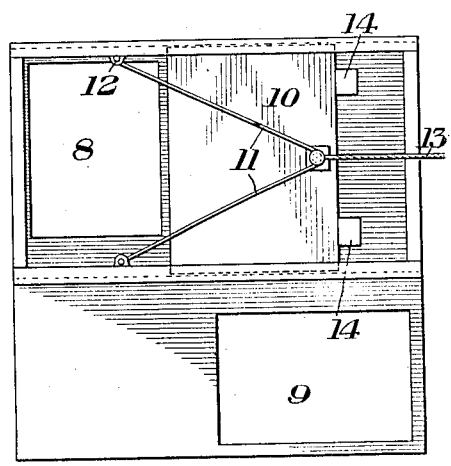
WITNESSES
R A Balderson
W W Swartz
INVENTOR
Jno. S. Fax.
by Bakewell, Byrnes & Parmelee,
his Attys.

UNITED STATES PATENT OFFICE.

JOHN S. FAX, OF WILKINSBURG, PENNSYLVANIA.

ILLUSION TOY.

No. 904,121.  Specification of Letters Patent.  Patented Nov. 17, 1908.

Application filed July 18, 1908. Serial No. 444,194.

*To all whom it may concern:*

Be it known that I, JOHN S. FAX, of Wilkinsburg, in the county of Allegheny and State of Pennsylvania, have invented an Illusion Toy, of which the following is a full, clear, and exact description, reference being had to the accompanying drawings, forming part of this specification, in which—

Figure 1 is a perspective view of the box with the cover removed; Fig. 2 is a top plan view of the box with a portion of the translucent glass broken away to more clearly show the traveling shutter; and Fig. 3 is a plan view of the box cover, on a reduced scale.

My invention relates to toys in which optical illusions are produced, and is designed to provide a cheap, simple and attractive toy of this character.

In the drawings, 2 represents a flat box of opaque material having an opaque bottom and an eye piece 3, at one corner. The side 4 of the box is cut open at the inner end of the eye-piece and the inside of the box is divided into compartments by opaque partitions 5 and 6, and a diagonal glass plate 7. The partitions 5 and 6 form an L-shaped channel which is diagonally crossed by the glass piece 7, extending from the corner of the box to the corner formed by the partitions 5 and 6. The top of the box is covered and is provided with light-admitting portions 8 and 9, these portions being above the end portions of the L-shaped channel. These light-admitting portions may be formed of ground glass or other translucent material which will prevent free sight of the interior of the box while admitting light.

Beneath the window portion 8, I place a horizontally traveling shutter 10, having its edges moving within suitable guides in the top portion of the box under the window. This shutter is normally held yieldingly in position to close the light-admitting window 8, preferably by a spring 11. I have shown this spring as in the form of a rubber elastic band which extends from fixed points 12 to the sides of and around a projection on the shutter. A string 13 is attached to the shutter and extends across the box and to its outside. The movement of the shutter is stopped in one position by stops 14 and in the other position by the side of the box or any other suitable stop.

The interior of the L-shaped channel is lined with white cotton wool and two objects, such as an egg *a* and a chicken *b*, are placed in the opposite end portions of the L-shaped channel beneath the light-admitting windows.

When the eye-piece is applied to the eye with the shutter in normal position, the direct light is shut off from the chicken and the plain glass 7 becomes a mirror which reflects to the eye the egg at the other end of the channel, as shown diagrammatically in Fig. 1, to which light is admitted through its top window. On pulling the slide back above the chamber 15 of the box, the light is admitted to the chicken and the egg appears to melt into a chicken.

The advantages of my invention result from the simplicity, cheapness and attractiveness of the toy. The device may be cheaply made and by having the light windows arranged to transmit light to hide the mechanism, the illusion effect is simply produced.

The objects may be changed, the shape and form of the box may be altered and other changes may be made without departing from my invention.

I claim:

1. In an illusion toy, an opaque box having an L-shaped channel with a diagonal glass piece at its corner, an eye-piece directed toward the glass, objects in the different legs of the channel, windows to give light to said objects, and a shutter arranged to control the admission of light to one of the objects, substantially as described.

2. In an illusion toy, an opaque box having an L-shaped channel with a diagonal glass piece at its corner, an eye-piece directed toward the glass, objects in the different legs of the channel, windows to give light to said objects, a shutter arranged to control the admission of light to one of the objects, said shutter being yieldingly held in normal position, and a device for withdrawing it from normal position, substantially as described.

3. In an illusion toy, a box having passages or compartments at an angle to each other, a diagonal piece of glass at the juncture of the passages or compartments, a view opening directed towards the glass, windows for admitting light to objects within the passages or compartments, and a movable shutter for controlling one of said windows, substantially as described.

In testimony whereof, I have hereunto set my hand.

JOHN S. FAX.

Witnesses:
A. F. TIBBETTS,
H. M. CORWIN.